United States Patent [19]

Patterson

[11] 3,986,722

[45] Oct. 19, 1976

[54] SAILING BICYCLE

[76] Inventor: George W. Patterson, 134 Valley Road, New Canaan, Conn. 06840

[22] Filed: Oct. 17, 1974

[21] Appl. No.: 515,474

[52] U.S. Cl. .................................. 280/16; 114/43; 114/103; 280/213
[51] Int. Cl.² ........................................ B62B 15/00
[58] Field of Search ..... 280/213, 212, 289, 11.37 S, 280/16; 114/39, 103, 43; 180/1 FV, 2

[56] References Cited

UNITED STATES PATENTS

| 23,277 | 3/1859 | Thomas | 280/213 X |
|---|---|---|---|
| 390,632 | 10/1888 | Waite et al. | 280/213 X |
| 464,227 | 12/1891 | Olsen | 114/39 X |
| 947,731 | 1/1910 | Couder | 280/213 |
| 2,443,565 | 6/1948 | Land | 280/213 |
| 2,793,870 | 5/1957 | Bowman | 114/103 X |
| 3,026,121 | 3/1962 | Ellam | 280/16 |
| 3,572,740 | 3/1971 | Rypinski | 280/16 |
| 3,610,660 | 10/1971 | Price | 280/289 |
| 3,650,344 | 3/1972 | Plessinger | 180/27 |
| 3,836,176 | 9/1974 | Ylvisaker | 280/213 |
| 3,848,891 | 11/1974 | Vittori | 280/242 R X |

FOREIGN PATENTS OR APPLICATIONS

| 460,111 | 11/1913 | France | 180/2 |
|---|---|---|---|
| 21,468 | 3/1903 | United Kingdom | 280/213 |

*Primary Examiner*—M. H. Wood, Jr.
*Assistant Examiner*—John P. Silverstrim
*Attorney, Agent, or Firm*—Bacon & Thomas

[57] ABSTRACT

A frame equipped with a fork on the front thereof carries either wheels or runners to engage the surface, and has a transversely extending seat mounted thereon that projects from both sides of the frame. A mast is mounted on the frame forwardly of the fork, and has a rearwardly-extending boom pivotally connected thereto, the mast and the boom carrying a sail. A hand-hold is formed on the boom, whereby a rider seated on the transversely extending seat can manipulate the sail to operate the bicycle, the seat facilitating side-to-side shifting of the rider's weight during operation. A closed loop handle on the fork makes one-hand steering of the bicycle easy to obtain.

16 Claims, 9 Drawing Figures

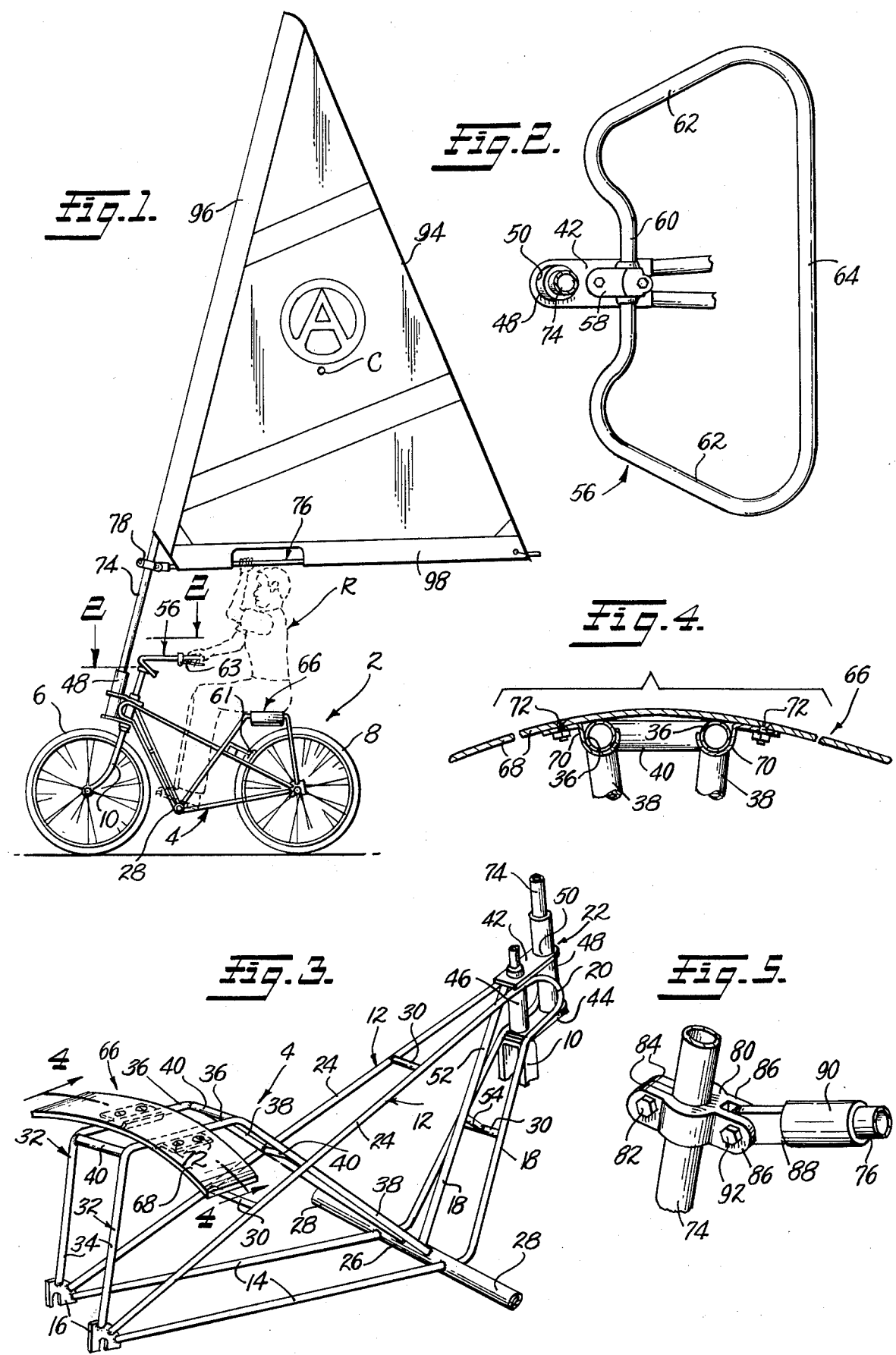

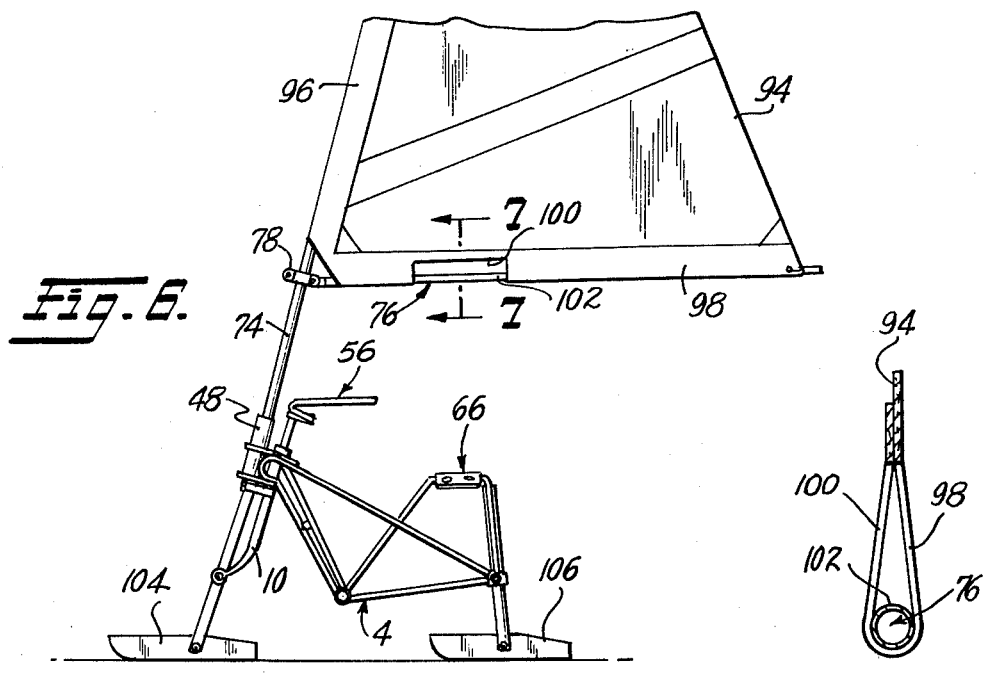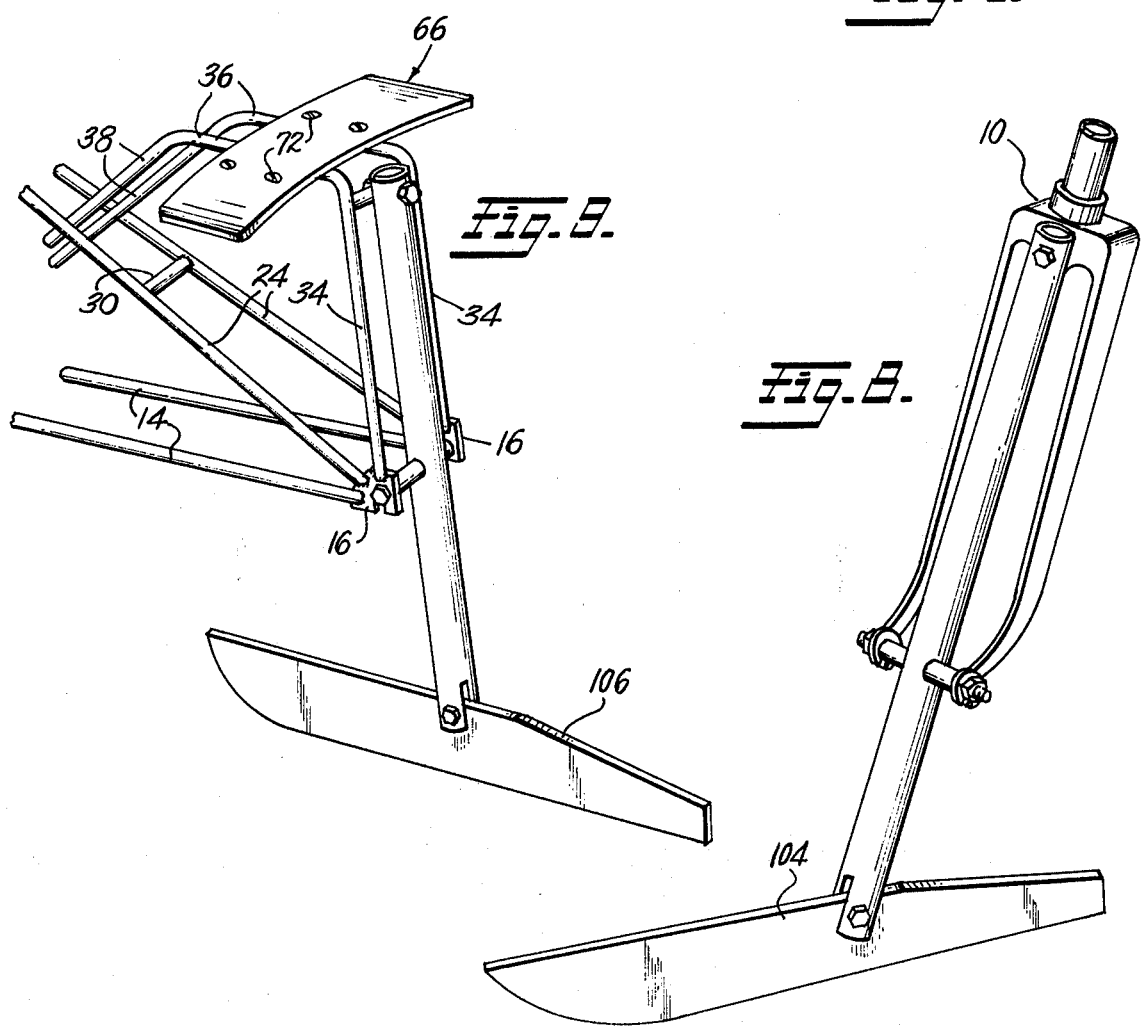

SAILING BICYCLE

BACKGROUND OF THE INVENTION

1. Field of the Invention

This invention relates generally to non-motorized land vehicles especially of the type used for recreation and enjoyment. More particularly, it relates to a unique sailing bicycle vehicle that can be alternatively fitted with either wheels or with runners for operation on ice, and which is designed to provide full sailing capability for the rider thereof.

2. Description of the Prior Art

The bicycle as a non-motorized vehicle has long been known. There have been attempts made in the past to fit such vehicles with a sail, in an effort to provide propulsive power other than that offered by the conventional foot pedal and chain arrangement. Generally, these attempts have not provided a fully satisfactory sailing vehicle, primarily because not enough attention was paid to the principles of sailing when designing the vehicle.

Typical of past efforts at fitting a sail to a bicycle are the vehicles shown in U.S. Pat. Nos. 947,731, 2,038,166 and 2,443,565. Each of these vehicles utilizes a conventional bicycle, to the rear of which a sail is mounted. The result is a wind-powered vehicle wherein the sail is difficult to manipulate, and which a rider has difficulty in balancing and steering during use. Because a conventional bicycle with its saddle seat is utilized as the basic vehicular structure, the rider finds it difficult to accomplish the quick shifting of body weight required to effect tacking-like movements, and to adjust to wind changes. Further, the rear-mounted sail is remote, and out of the riders vision; thus, effective control thereof is hard to attain.

A sailing bicycle arrangement has also been proposed wherein a fixed sail is mounted forwardly on a conventional bicycle. While better visibility of the sail is thus attained, the fixed nature thereof makes it difficult to take full advantage of wind conditions, and again the conventional nature of the vehicle makes balancing and steering difficult to manage, especially in changing wind conditions. An attempt has been made to modify such front-mounted sails to make them adjustable with the usual pulleys and lines found on sea-going vessels, but such lines cannot be effectively handled under any but the most stable of wind conditions while riding the bicycle.

There is thus a need for a sailing bicycle arrangement that can be easily handled under varying wind conditions, and which offers maximum maneuvering capability to the rider. The present invention is directed toward satisfying that need.

SUMMARY OF THE INVENTION

The sailing bicycle of the present invention offers a choice of either wheels or runners as a surface engaging means, and thus can be used on land, or as an ice vehicle. It includes a modified frame having a conventional fork on the forward end thereof, to which the front wheel or runner is attached. Mounted on the frame between the wheels or runners is a specially designed seat, and mounted forwardly of the fork is a generally vertically disposed mast having a rearwardly extending boom pivotally connected thereto. A sail is mounted on its luff and foot sides to the mast and the boom, respectively, and foot rests project from opposite sides of the frame. The conventional pedal and chain arrangement usually found on a bicycle is eliminated, and hand-operated caliper brakes are used to provide a stopping capability.

In order to provide full control over the sail so that such can be quickly and accurately adjusted, all lines and pulleys are eliminated. Rather, the boom is provided with a hand hold that is grasped by the rider in either hand, depending upon wind direction and the intended direction of movement of the vehicle. The rider thus manually adjusts the position of the boom, using his hand and arm. This results in a far more effective sail arrangement than any that has heretofore been proposed for bicycle-type vehicles.

As has been noted above, a problem with past wind-propelled bicycles has been the inability of the rider to effect sufficient changes, rapidly enough in the position of his body to accommodate wind changes or changes in direction of movement of the vehicle. Because past wind-propelled bicycles have not provided for such rapid shifting of the human body, balance has been difficult to maintain, and steering has been adversely affected. This problem is overcome in the invention by the unique seat construction of the present sailing bicycle.

The conventional saddle-type bicycle seat has been replaced in the invention by a transversely extending seat that projects a substantial distance from both sides of the frame, and which has a smooth upper surface that is preferably convex in shape. This elongated transverse seat permits the rider to easily and quickly shift his body weight from one side of the frame to the other, as needed to maintain the stability of the bicycle while such is under sail. The fixed foot rests on the frame assist in making such movements of the body.

A special handle is also provided on the fork of the present sailing bicycle, one that ensures full control and which is designed to enable easy and sure transfer of steering control from one hand to the other. Such shifting of steering is, of course, necessary when the rider must move the hand-held boom from one side of the vehicle to the other, as when he comes about. Specifically, the handle of the invention is preferably in the form of a closed loop, presenting a relatively straight elongated portion toward the seated rider.

It has also been found that the position of the sail relative to the frame and wheels or runners of the bicycle is important, to achieve maximum sailing characteristics. More specifically, it has been found that the center of effort of the sail should be placed a short distance rearwardly of the axis of rotation of the rear wheel, in a conventional bicycle configuration about 6 inches to the rear thereof. When the sail is thus arranged, the bicycle is of maximum directional stability, and can be maneuvered with the greatest ease.

It is a principal object of the present invention to provide a sailing bicycle-type vehicle that can be easily handled under varied wind conditions, one where the rider can maintain balance and readily adjust to changes in wind speed or direction, and changes in the direction of movement of the vehicle.

Another object is to provide a sailing bicycle that can utilize either wheels or runners for surface engaging elements, and wherein such elements are easily interchanged.

Yet another object is to provide a sailing bicycle with a unique seat, designed to permit the rider to effectively and quickly change the position of his body weight to compensate for changes in operating conditions.

Still another object is to provide a sailing bicycle wherein the sail is hand-held for effective control, and which is provided with a unique handle arrangement that enables the rider to quickly change hands used for steering while underway.

Other objects and many of the attendant advantages of the present invention will become readily understood from the following Description of the Preferred Embodiments, when taken in conjunction with the accompanying drawings.

BRIEF DESCRIPTION OF THE DRAWINGS

FIG. 1 is a side elevational view of a first embodiment of the present invention, showing a wheel-equipped vehicle under sail and illustrating the manner in which a rider grasps the boom in one hand and the closed loop steering handle in the other;

FIG. 2 is an enlarged, sectional view taken along the line 2—2 in FIG. 1, and showing the closed loop steering handle in plan view.

FIG. 3 is a perspective view of the frame of the sailing bicycle of the invention, showing in particular the fixed foot rests and the unique transverse seat;

FIG. 4 is a vertical sectional view taken on the line 4—4 in FIG. 3, and showing how the transverse seat member is attached to the frame;

FIG. 5 is an enlarged, fragmentary view showing the swivel joint utilized to connect the boom to the mast;

FIG. 6 is a fragmentary, side elevational view showing a second embodiment of the invention, wherein the wheels are replaced with front and rear runners for operation on ice;

FIG. 7 is an enlarged, vertical sectional view taken on the line 7—7 of FIG. 6, and showing the hand-hold for controlling the boom and sail;

FIG. 8 is an enlarged, perspective view showing how the front runner is attached to the fork; and FIG. 9 is an enlarged, fragmentary view showing how the rear runner is attached to the frame.

DESCRIPTION OF THE PREFERRED EMBODIMENTS

Referring now to FIGS. 1-5 of the drawings, a first embodiment of the sailing bicycle of the invention is indicated generally at 2, such including a frame 4 having front and rear wheels 6 and 8, respectively, mounted thereon, the front wheel 6 being carried by a conventional bicycle fork 10. The frame 4 is fabricated from tubular elements, and includes a pair of side members 12 bent from tubular steel or the like.

Each side member 12 comprises a straight, generally horizontal bottom rail 14 welded at its free end to a wheel-mounting bracket plate 16, an upwardly inclined rail 18, a reverse loop portion 20 for receiving a mounting bracket 22, and an inclined upper rail 24 that leads back to and which is welded at its free end to the wheel-mounting bracket plate 16. The bottom rails 14 pass through diametric bores in and are welded to transversely disposed tubular member 26, the member 26 projecting laterally from the side members 12 to form fixed foot rests 28. Rigidity is added to the assembled side members 12 by cross braces 30, welded in place.

In addition to the side members 12, the frame 4 includes a pair of tubular seat supporting members 32, each being bent from tubular steel or the like. Each supporting member 32 includes a vertical riser rail 34 welded at its lower end to its associated wheel-mounting plate 16, a horizontally extending mounting rail 36, and a downwardly inclined forward rail 38 that is welded to the associated side members 12 where they cross, and to the tubular member 26 between the side members 12.

Horizontal brace members 40 add rigidity to the supporting members 32.

The mounting bracket 22 comprises upper and lower plates 42 and 44, respectively, welded to the upper and lower surfaces of the loops 20 of the side members 12, a tubular housing 46 extending between the plates 42 and 44 and being adapted to mount the bicycle fork 10 in the usual manner. The upper and lower plates 42 and 44 extend forwardly from the loops 20, and the lower end of a socket member 48 rests on the extended portion of the lower plate 44 and passes upwardly through an opening 50 in the upper plate 42. The socket member 48 is welded in place, and is tipped or canted rearwardly at about a 15° angle from the vertical. A brace rod 52 extends between the member 26 and the upper plate 42 and a short brace 54 connects it with the associated brace 30.

The wheels 6 and 8 are respectively mounted to the fork 10 and the rear wheel-mounting bracket plates 16 in the usual manner, and a steering handle 56 is connected to the upper end of the fork 10. The upper end of the fork 10 carries the usual handle securing clamp 58 thereon, which receives the tubular mounting portion 60 of the handle 56. The handle 56, as can be clearly seen in FIG. 2, is a closed loop, and in addition to the mounting portion 60 includes diverging sides 62, and a relatively straight front portion 64 that confronts a rider so that it can be easily grasped in either hand.

Braking is accomplished by caliper brakes 61 on the rear wheel 8, operated by a hand grip 63 on the handle 56. The bicycle of the invention also included a seat 66, attached to the frame 4 between the two wheels 6 and 8, and more particularly over the forward portion of the rear wheel 8. The seat 66 comprises a transversely extending, smooth convex elongated member 68 that rests on the horizontally extending rails 36 of the seat supporting members 32, and which is secured thereto by clamps 70 and bolts 72. The member 68 is made of a material sufficiently strong and rigid that it will hold its convex configuration under lateral shifting of the rider's weight therealong, and as will be evident the smooth, arcuate configuration thereof greatly assists such transverse weight shifting.

The lower end of a mast 74 is telescopically received in the socket 48, such extending vertically above the frame 4 and having the forward end of a generally horizontal boom 76 connected thereto by a swivel bracket 78. The bracket 78 includes a split clamp body 80 that encircles the mast 74, and which is secured thereto by a bolt 82 passing through ears 84. Opposite the ears 84 the split body 80 has a pair of vertically disposed mounting lugs 86 thereon, between which the flattened end 88 of a mounting socket 90 is pivotally secured by a bolt 92. The forward end of the boom 76 is secured within the mounting socket 90, and the resultant arrangement is such that the boom 76 can be freely pivoted upwardly and downwardly in a plane containing the mast 74. Shifting of the boom 76 from side to side is provided for by having the lower end of the mast 74 freely rotatable in its mounting socket 48.

Mounted on the mast 74 and the boom 76 is a triangular sail 94, the leading or luff edge and the lower or foot edge of the sail having sleeves 96 and 98, respectively, formed thereon that receives the mast 74 and the boom 76. The upper and outer tips of the sail 94 are secured to the top and the outer end of the mast 74 and boom 76, respectively, by lacing, in the normal manner.

As is best shown in FIG. 1, the boom 76 is placed vertically above a rider R seated on the bicycle, so that it can be swung to either side. As has been mentioned, it is a feature of the invention that the position of the sail 94 is manually controlled, to provide for rapid, effective handling thereof. To achieve such manual control with ease, the foot of the sail 94 has a rectangular cutout 100 therein, so that a portion 102 of the boom 76 is exposed to form a hand-hold. The hand-hold 102 is so positioned outwardly from the bracket 78 that it can be conveniently grasped with either hand by the rider R, with arm raised and slightly forward of the body. Obviously, other expedients can also be utilized to provide for such a hand-hold on the boom.

In order to provide the greatest stability to the sailing bicycle 2, it has been found that the center of effort C of the sail 94 should be placed a short distance to the rear of the axis of rotation of the rear wheel 8. By way of example only, and not as a limitation, in a typical embodiment of the invention wherein the wheels 6 and 8 are about 26 inches in diameter and the axes of rotation thereof are spaced apart about 44 inches, the center of effort C should be about 6 inches behind, and vertically above, the axis of the rear wheel 8.

It is believed that the manner of using the sailing bicycle of FIGS. 1–5 is readily apparent. The rider R first mounts the vehicle and then grasps the boom 76 by the hand-hold 102 to position the sail 94 for catching the wind. Once underway, the rider R places his feet on the fixed footrests 28, whereby a firm base is provided for shifting the body weight back and forth along the arcuate seat member 68 to effect trim and balance of the moving bicycle. The closed loop handle 56 is easily grasped in the other hand, and can be maneuvered to steer the vehicle. With practice, the rider R can carry out most of the tacking and other maneuvers common to sailing a small water craft.

When the time comes to come about, the rider R swings the boom 76 from one side of the vehicle to the other, changing hands in the process. The easily grasped hand-hold 102 helps in this maneuver, and in particular the closed loop handle 56 makes it easy to shift steering hands without losing control over the bicycle.

As has been mentioned, the socket 48 has a rearward inclination of about 15°, which in turn gives the mast 74 a rearward rake of the same extent. It has been found that a 15° rake adds to the performance of the vehicle, but it is to be understood that if desired the socket 48 can be placed vertical or at some other angle of inclination.

Turning now to FIGS. 6–9, a second embodiment of the invention is shown wherein a form of surface engaging means other than the wheels 6 and 8 is employed. More specifically, in FIGS. 6–9 the front and rear wheels 6 and 8 are removed from the bicycle, and in their place front and rear runners 104 and 106, respectively, for operating on an icy surface are installed.

Turning first to FIG. 8, the manner of mounting the front runner 104 is illustrated therein. The fork 10, of conventional construction, includes a header 108 from which a pair of downwardly extending legs 110 depend, the lower ends of the legs 110 terminating in axle-mounting bracket plates 112 similar to the plates 16. The front runner 104 has the lower, bifurcated end of a mounting tube 114 pivoted centrally thereto by a bolt 116, the upper end of the mounting tube 114 being secured to the header 108 by a screw 118 threaded into a tapped hole provided in the header. Medially thereof the mounting tube 114 has a transverse, axle-like member 120 mounted to extend therethrough, the opposite ends of the member 120 being secured to the bracket plates 112 by nuts 122 in the usual manner. With this arrangement, it is evident that the front runner 104 can be steered by turning the fork 10 with the handle 56, much like a wheel.

The rear runner 106 is mounted in a similar manner, and has the bifurcated lower end of a mounting tube 124 pivoted centrally thereto by a bolt 126. The upper end of the mounting tube 124 is secured to a cross brace 40 at the upper ends of the vertical riser rails 34 by a clamp bolt 128, and medially thereof a transverse, axle-like member 130 passes through the mounting tube 124 and has its opposite ends secured to the bracket plates 16 by a bolt 132.

With the runners 104 and 106 in place, the sailing bicycle can be operated on a frozen lake or elsewhere, to the great enjoyment of the rider R. The manner of operation on ice is similar to the manner in which it is operated when equipped with the wheels 6 and 8.

It is thus apparent that a sailing bicycle has been provided which meets all of the objectives hereinabove set forth. Obviously, modifications and variations from the construction shown and described herein can be made, without departing from the invention.

I claim:

1. A wind-driven land vehicle, comprising: a frame; a rear surface engaging means mounted on the aft end of said frame; fork means mounted on the forward end of said frame, said fork means carrying a front surface engaging means; handle means connected to said fork means, and effective to turn said front surface engaging means; a seat means mounted on said frame between said front and said rear surface engaging means; a mast; means mounted on said frame forwardly of said fork means for mounting said mast in a generally upright position; a boom; means connecting said boom to said mast to extend generally horizontally rearwardly therefrom; a sail, said sail including means for mounting the luff and foot thereof to said mast and said boom, respectively; and means on said boom forming a hand hold for grasping by a person using said wind-driven land vehicle, the center of effort of said sail being disposed a short distance rearwardly from and generally vertically above the mounting axis of said rear surface engaging means.

2. A wind-driven land vehicle as recited in claim 1, wherein said front and said rear surface engaging means each comprise a single wheel.

3. A wind-driven land vehicle as recited in claim 1, wherein said front and said rear surface engaging means each comprise a single runner for operation on ice and the like.

4. A wind-driven land vehicle as recited in claim 1, wherein said frame includes foot rests projecting from the opposite sides of the lower portion thereof.

5. A wind-driven land vehicle as recited in claim 1, wherein said handle means comprises a closed loop member, said member having a relatively straight continuous portion disposed to confront a rider on said seat means.

6. A wind-driven land vehicle as recited in claim 1, wherein said means for mounting said mast comprises a socket member attached to said frame, said socket member facing upwardly and being sized to telescopically receive the lower end of said mast.

7. A wind-driven land vehicle, comprising: a frame; a rear surface engaging means mounted on the aft end of said frame; fork means mounted on the forward end of said frame, said fork means carrying a front surface engaging means; handle means connected to said fork means, and effective to turn said front surface engaging means; a seat means mounted on said frame between said front and said rear surface engaging means, said seat means including a transverse seat member, said seat member projecting from the opposite sides of said frame for a substantial distance whereby to facilitate a rider shifting his body weight from side to side of the frame during operation of the vehicle by sliding along the length of said seat member; a mast; means mounted on said frame forwardly of said fork means for mounting said mast in a generally upright position; a boom; means connecting said boom to said mast to extend generally horizontally rearwardly therefrom; a sail, said sail including means for mounting the luff and foot thereof to said mast and said boom, respectively; and means on said boom forming a hand hold for grasping by a person using said wind-driven land vehicle.

8. A wind-driven land vehicle, comprising: a frame; a rear surface engaging means mounted on the aft end of said frame; fork means mounted on the forward end of said frame, said fork means carrying a front surface engaging means; handle means connected to said fork means, and effective to turn said front surface engaging means; a seat means mounted on said frame between said front and said rear surface engaging means, said seat means including a transverse seat member projecting from the opposite sides of said frame for a substantial distance whereby to facilitate a rider shifting his body weight from side-to-side of the frame during operation of the vehicle by sliding along the length of said seat member; a mast; means mounted on said frame forwardly of said fork means for mounting said mast in a generally upright position; a boom; means connecting said boom to said mast to extend generally rearwardly therefrom, said means being arranged to permit pivotal movement of said boom in a plane including said mast and said boom; and a sail, said sail including means for mounting the luff and foot thereof to said mast and said boom, respectively, a portion of said boom being exposed to form a hand hold for grasping by a person using said vehicle, and the center of effort of said being disposed a short distance rearwardly from and generally vertically above the mounting axis of said rear surface engaging means.

9. A wind-driven land vehicle as recited in claim 8, wherein said mast is inclined rearwardly.

10. A wind-driven land vehicle as recited in claim 9, wherein said mast is raked or inclined rearwardly at an angle of about 15° from the vertical.

11. A wind-driven land vehicle as recited in claim 10, wherein said front and said rear surface engaging means each comprise a generally vertical mounting tube, and a runner pivotally mounted to the lower end of said mounting tube, the front mounting tube being connectable to said fork means whereby such is turnable with said fork means to steer said vehicle, and the rear mounting tube being connectable to said frame.

12. A wind-driven land vehicle as recited in claim 10, wherein said front and said rear surface engaging means each comprise a wheel.

13. A wind-driven land vehicle as recited in claim 12, wherein said wheels have a diameter of about 26 inches, the axes of rotation thereof are spaced apart about 44 inches, and the center of effort of said sail is disposed about 6 inches rearwardly of the axis of rotation of the rear wheel.

14. A wind-driven land vehicle as recited in claim 8, wherein said handle means comprises a closed loop member having a relatively straight continuous portion disposed to confront a rider on said seat means.

15. A wind-driven land vehicle as recited in claim 8, including additionally foot rests projecting from the opposite sides of the lower portion of said frame.

16. A wind-driven land vehicle as recited in claim 8, wherein the upper surface of said transverse seat member is convex and smooth to further facilitate sliding movements of said rider thereacross.

* * * * *